United States Patent
Hagihara

(10) Patent No.: US 8,476,570 B2
(45) Date of Patent: Jul. 2, 2013

(54) SOLID-STATE IMAGE PICKUP DEVICE

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 77 days.

(21) Appl. No.: 13/285,545

(22) Filed: Oct. 31, 2011

(65) Prior Publication Data

US 2012/0043456 A1 Feb. 23, 2012

Related U.S. Application Data

(63) Continuation of application No. PCT/JP2010/002736, filed on Apr. 15, 2010.

(30) Foreign Application Priority Data

May 13, 2009 (JP) ................................. 2009-116364

(51) Int. Cl.
*H01L 27/00* (2006.01)

(52) U.S. Cl.
USPC ..................... 250/208.1; 250/214.1; 341/155; 341/157; 341/161; 341/163

(58) Field of Classification Search
USPC ................ 250/214.1, 214 R, 214 DC, 208.1, 250/208.2; 348/294, 297, 302, 311; 341/155, 341/157, 161, 163
See application file for complete search history.

(56) References Cited

U.S. PATENT DOCUMENTS

| 8,154,638 B2 * | 4/2012 | Hagihara ...................... 348/302 |
| 8,179,296 B2 * | 5/2012 | Kelly et al. .................... 341/155 |
| 2006/0243885 A1 | 11/2006 | Watanabe |

FOREIGN PATENT DOCUMENTS

| JP | 8-204566 A | 8/1996 |
| JP | 2006-013866 A | 1/2006 |
| JP | 2006-157105 A | 6/2006 |
| JP | 2006-270293 A | 10/2006 |
| JP | 2006-270298 A | 10/2006 |
| JP | 2006-287879 A | 10/2006 |

OTHER PUBLICATIONS

International Search Report of PCT/JP2010/002736, mailing date Jun. 8, 2010.

* cited by examiner

*Primary Examiner* — Francis M Legasse, Jr.
(74) *Attorney, Agent, or Firm* — Westerman, Hattori, Daniels & Adrian, LLP

(57) ABSTRACT

A solid-state image pickup device may include: an image pickup unit in which a plurality of pixels are arranged in a matrix; a sample-and-hold unit having a switch element and a capacitance element; a frequency conversion unit in which a plurality of stages of inverting circuits are connected, the pixel signal is supplied to the first power supply terminal, and a start signal for starting clock generation and an output signal from the inverting circuit of a predetermined stage are input to one of the inverting circuits; a counting unit that counts the clock output from the frequency conversion unit; and a buffer circuit provided between a first terminal of the capacitance element connected to the switch element and the first power supply terminal, wherein a second terminal of the capacitance element is connected to the second power supply terminal.

1 Claim, 6 Drawing Sheets

SOLID-STATE IMAGE PICKUP DEVICE

CROSS REFERENCE TO RELATED APPLICATIONS

This application is a continuation application based on a PCT Patent Application No. PCT/JP2010/002736, filed Apr. 15, 2010, whose priority is claimed on Japanese Patent Application No. 2009-116364, filed May 13, 2009, the entire content of which are hereby incorporated by reference.

BACKGROUND OF THE INVENTION

1. Field of the Invention

The present invention relates to a solid-state image pickup device.

2. Description of the Related Art

Various types of solid-state image pickup devices, such as a metal oxide semiconductor (MOS) transistor type, a charge coupled device (CCD) type, and the like, have previously been proposed and put into practical use. As the MOS type, there is an amplification type solid-state image pickup device in which pixels of an amplification type solid-state imaging device (active pixel sensor (APS)) configuration having an amplification type drive transistor are provided in a pixel signal generation means for generating a pixel signal corresponding to a signal charge generated by a charge generation means. Many (complementary) metal oxide semiconductor ((C)MOS) type solid-state image pickup devices are configured as described above.

Furthermore, column analog-to-digital (AD) converter (ADC) type solid-state image pickup devices in which an AD conversion function is embedded in a column unit have also been developed and commercialized. In addition to 1. Successive comparison AD conversion type, 2. Single slope AD conversion type, 3. Cyclic AD conversion type, and the like as AD conversion types, a column ADC type solid-state image pickup device (see Japanese Unexamined Patent Application, First Publication No. 2006-270293) has been proposed in which a time-to-digital converter (TDC) having a "voltage-frequency conversion" function according to a signal from a pixel is provided in the column unit. As disclosed in Japanese Unexamined Patent Application, First Publication No. 2006-270293, it is possible to comparatively easily AD-convert a signal from a pixel at a high signal-to-noise ratio (SNR) by use of the TDC.

Here, in general, the SNR by which image quality of the (C)MOS type solid-state image pickup device is determined will be described. A signal S is a value of a voltage into which a charge accumulated in a pixel is converted by a floating diffusion (FD) unit. 1. Photon shot noise, 2. 1/f noise, 3. Thermal noise, and 4. Circuit noise due to a potential fluctuation of a power supply/ground exist as a noise N. In general, a key point for improving the SNR is to reduce the 1/f noise, the thermal noise, and the circuit noise due to the potential fluctuation of the power supply/ground.

It is common to increase the size of a transistor or narrow a sampling frequency so as to reduce the 1/f noise. Also, it is common to narrow a pass band of a signal so as to reduce the thermal noise. Also, it is common to reduce (the influence of) a potential fluctuation by decreasing a resistance value of wiring so as to reduce the circuit noise due to the power supply/ground fluctuation.

If the TDC is applied to the column ADC type solid-state image pickup device, a streak phenomenon (lateral noise) occurs due to a fluctuation in a power supply voltage supplied to a voltage controlled oscillator (VCO) or ring delay line (RDL) circuit, which is a frequency conversion unit constituting a core of the TDC.

A propagation delay time of an inverting circuit constituting the VCO circuit or RDL circuit largely depends on the power supply voltage (a potential difference supplied to each of an upper power supply terminal and a lower power supply terminal connected to the inverting circuit). In the streak phenomenon, the potential fluctuation of the power supply/ground appears as noise.

Here, as shown in FIG. 7, it is assumed that a pixel signal A is large in a column A, a value of a current Ia flowing through a frequency converter is large, a pixel signal B is small in an adjacent column B and a value of a current Ib flowing through a frequency converter is small. Incidentally, R is the wiring resistance, and VSS is the ground. The influence of a voltage drop ($\Delta V \approx R \times Ia$) due to the current Ia (>Ib) flowing through the column A typically appears in a terminal b, and a ground potential fluctuates. In particular, for example, because there is one TDC per column in the column ADC type solid-state image pickup device, the entire fluctuation increases even when there is a small potential fluctuation of a power supply/ground per TDC, and becomes a problem as noise.

SUMMARY

The present invention provides a solid-state image pickup device in which a circuit noise due to a potential fluctuation of a power supply/ground can be reduced.

A solid-state image pickup device may include: an image pickup unit in which a plurality of pixels are arranged in a matrix to output a pixel signal corresponding to the amount of an incident electromagnetic wave; a sample-and-hold unit having a switch element and a capacitance element to sample and hold the pixel signal; a frequency conversion unit in which a plurality of stages of inverting circuits of which delay times of an input signal and an output signal are varied in accordance with a potential difference between signals supplied to a first power supply terminal and a second power supply terminal are connected, the pixel signal is supplied to the first power supply terminal, and a start signal for starting clock generation and an output signal from the inverting circuit of a predetermined stage are input to one of the inverting circuits to generate a clock at a frequency corresponding to a magnitude of the pixel signal; a counting unit that counts the clock output from the frequency conversion unit; and a buffer circuit provided between a first terminal of the capacitance element connected to the switch element and the first power supply terminal. A second terminal of the capacitance element may be connected to the second power supply terminal.

According to a solid-state image pickup device of the present invention, it is possible to reduce a circuit noise due to a potential fluctuation of a power supply/ground.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
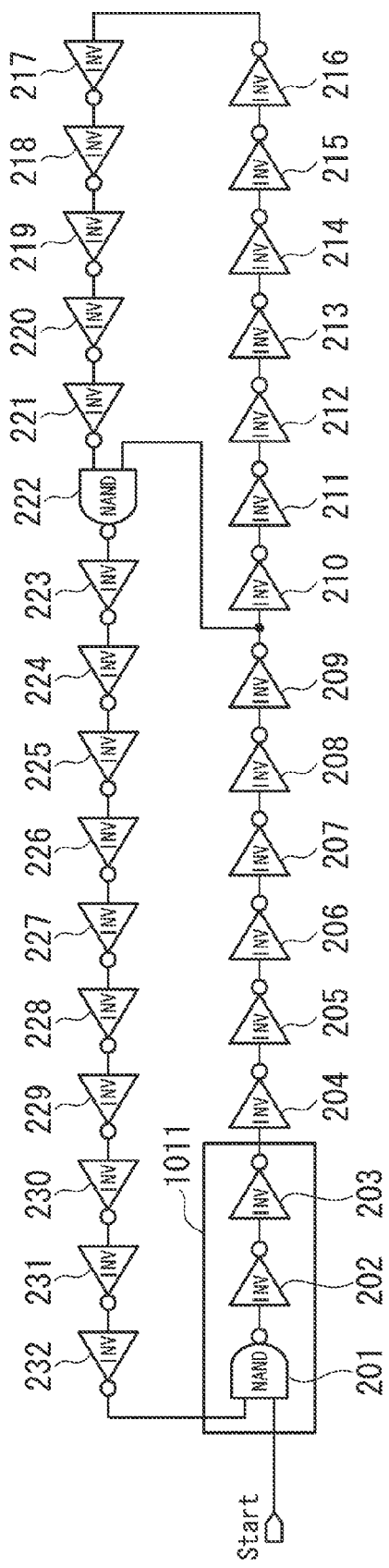
FIG. 1 is a configuration diagram showing a configuration of a frequency conversion unit in accordance with a first preferred embodiment of the present invention.

FIG. 1 is a configuration diagram showing a configuration of a frequency conversion unit in accordance with a first preferred embodiment of the present invention. The frequency conversion unit is an RDL configured by connecting a plurality of inverting circuits of which a delay amount fluctuates in accordance with the magnitude of a signal input to a power supply terminal.

The RDL includes a negative AND circuit (NAND) 201 to which a start pulse is input as a start signal, 30 inverter circuits (INVs) 202 to 221 and 223 to 232 connected to the NAND 201, and a NAND 222. Outputs of the INVs 221 and 209 are respectively input to inputs of the NAND 222. This is because an output of each delay device oscillates in a cycle corresponding to a delay time of the delay devices (the NAND 201 and 222 and the INVs 202 to 221 and 223 to 232) while the start pulse is input.

As an operation of the RDL, an inverting operation is started by the start pulse varying from a low state to a high state, and continued during a period that is approximately equal to the duration of the high state of the start pulse.

Figure 2:
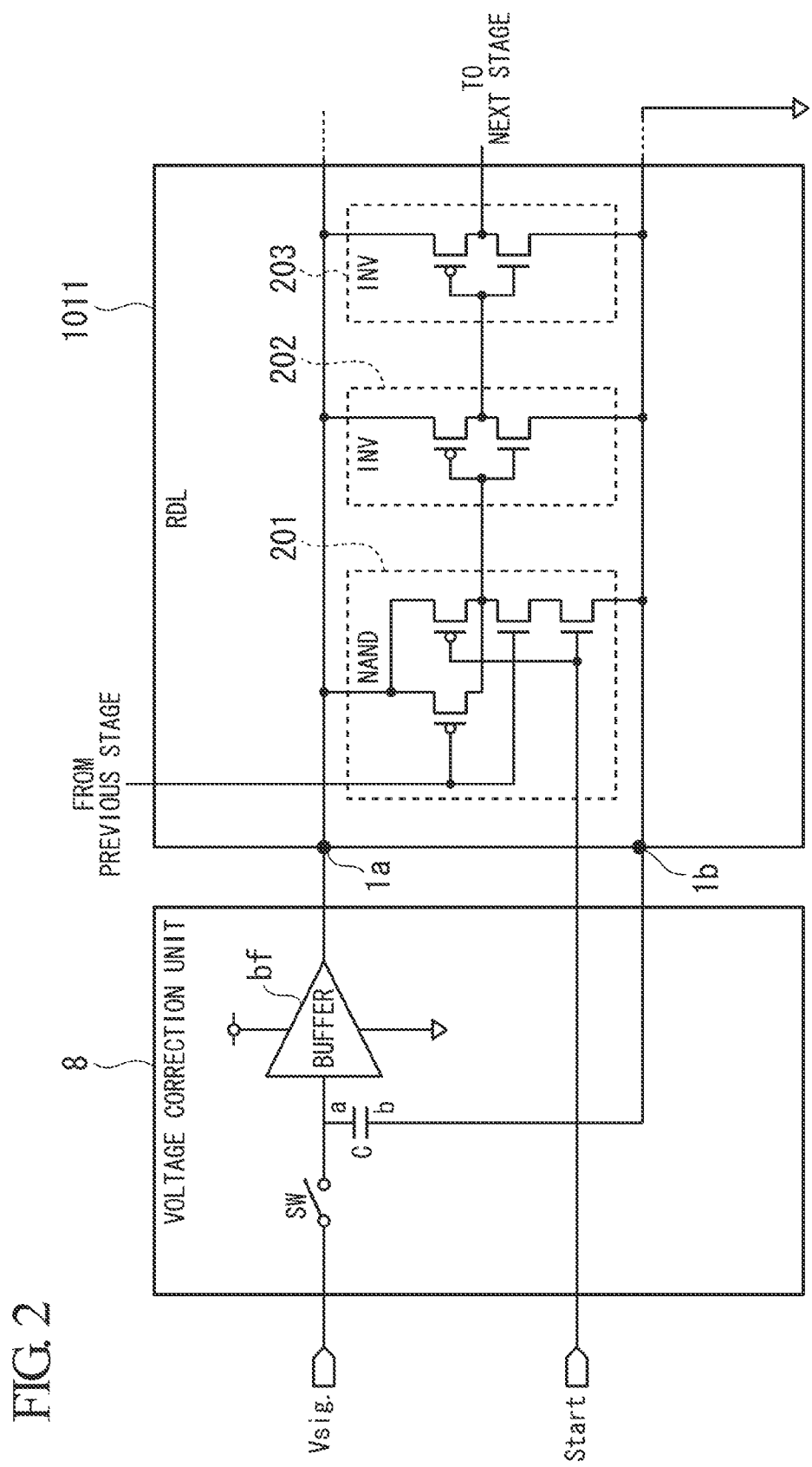
FIG. 2 is a partially enlarged diagram of FIG. 1 showing a configuration of a frequency conversion unit in accordance with a first preferred embodiment of the present invention.

FIG. 2 is a diagram specifically showing a first example of a partially enlarged diagram of the RDL shown in FIG. 1 (a part denoted by reference numeral 1011 in FIG. 1) and a voltage correction unit (a sample-and-hold unit), which is a proposed configuration. Hereinafter, the first example will be described. A voltage correction unit 8 includes a switch element SW to sample and hold an input signal Vsig., a capacitance element C having a first terminal a connected to the switch element SW and a second terminal b connected to a lower power supply terminal 1b of an RDL 101 (or a second power supply terminal), and a buffer circuit bf, which supplies a voltage corresponding to the input signal Vsig. to an upper power supply terminal 1a of the RDL 101 (a first power supply terminal). An output impedance of the buffer circuit bf is low and an input impedance is high.

Next, an operation of the voltage correction unit 8 will be described. First, the switch element SW is turned on, so that the input signal Vsig. is sampled to the capacitance element C, and then the switch element SW is turned off. Thereafter, the input signal Vsig. held in the capacitance element C is AD-converted.

For example, if a voltage rise $\Delta V1$ occurs in the lower power supply terminal 1b of the RDL 101 during the AD conversion, the voltage rise $\Delta V1$ also occurs in the second terminal b of the capacitance element C. The capacitance element C is configured to be a certain degree larger than parasitic capacitances added to the first terminal a and the second terminal b, so that a voltage of the first terminal a of the capacitance element C is raised by a voltage $\Delta V2$ ($\approx \Delta V1$), which is approximately equal to the voltage rise $\Delta V1$. That is, a potential difference between the upper power supply terminal 1a and the lower power supply terminal 1b supplied to the RDL 101 is not substantially affected by the voltage rise $\Delta V1$.

Thereby, it is possible to suppress a fluctuation in the potential difference between the upper power supply terminal and the lower power supply terminal due to a fluctuation in the potential of the lower power supply terminal.

Figure 3:
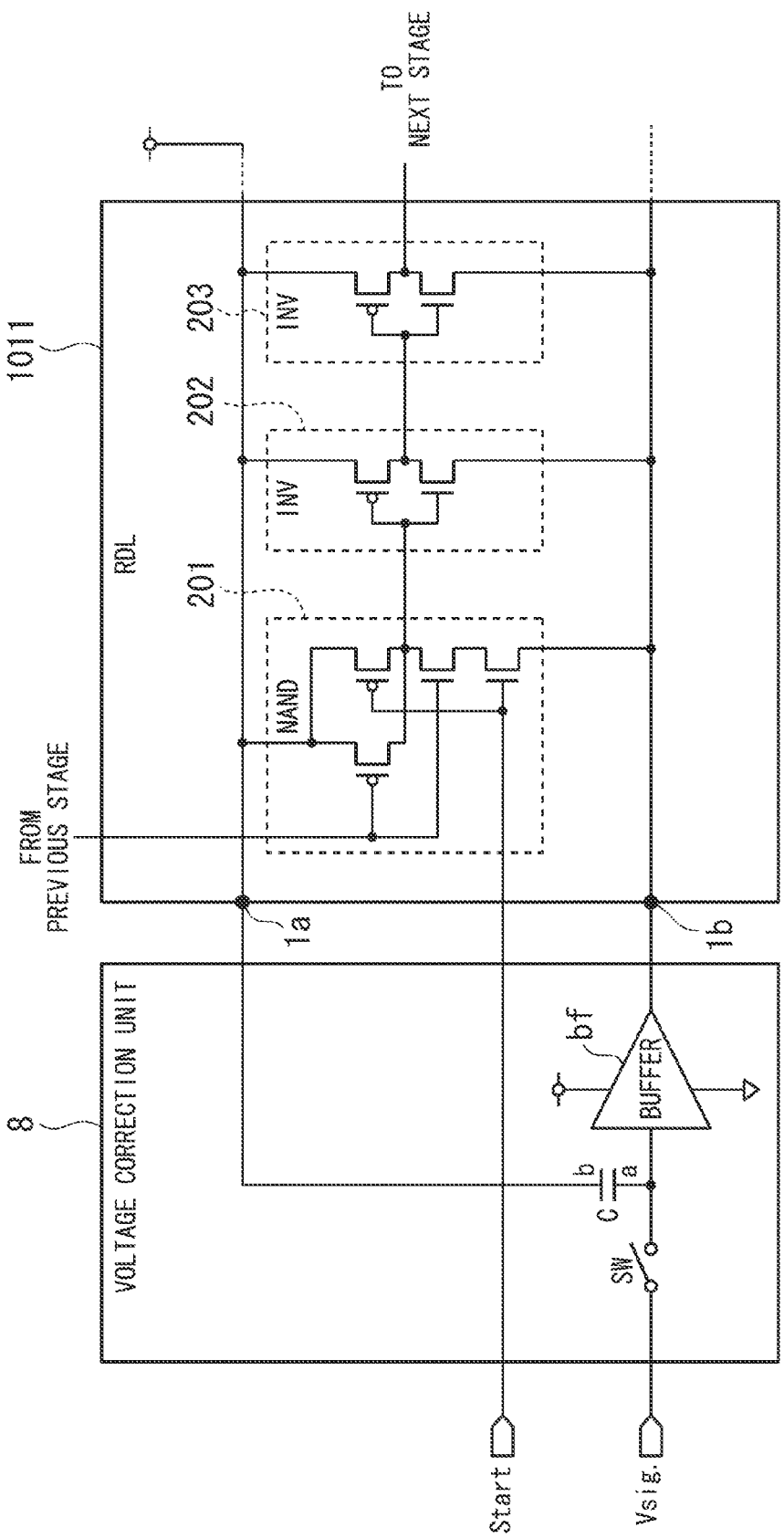
FIG. 3 is a partially enlarged diagram of FIG. 1 showing a configuration of a frequency conversion unit in accordance with a first preferred embodiment of the present invention.

FIG. 3 is a diagram specifically showing a second example of a partially enlarged diagram of the RDL shown in FIG. 1 (the part denoted by reference numeral 1011 in FIG. 1) and a voltage correction unit, which is a proposed configuration. Hereinafter, the second example will be described. A voltage correction unit 8 includes a switch element SW to sample and hold an input signal Vsig., a capacitance element C having a first terminal a connected to the switch element SW and a second terminal b connected to an upper power supply terminal 1a of the RDL 101 (a second power supply terminal), and a buffer circuit bf, which supplies a voltage corresponding to the input signal Vsig. to a lower power supply terminal 1b of the RDL 101 (a first power supply terminal). The output impedance of the buffer circuit bf is low and the input impedance is high.

Next, an operation of the voltage correction unit 8 will be described. First, the switch element SW is turned on, so that the input signal Vsig. is sampled to the capacitance element C, and then the switch element SW is turned off. Thereafter, the input signal Vsig. held in the capacitance element C is AD-converted.

For example, if a voltage drop $\Delta V1$ occurs in the upper power supply terminal 1a of the RDL 101 during the AD conversion, the voltage drop $\Delta V1$ also occurs in the second terminal b of the capacitance element C. The capacitance element C is configured to be a certain degree larger than the parasitic capacitances added to the terminals a and b, so that a voltage of the first terminal a of the capacitance element C is dropped by a voltage $\Delta V2$ ($\approx \Delta V1$), which is approximately equal to the voltage variation $\Delta V1$. That is, a potential difference between the upper power supply terminal 1a and the lower power supply terminal 1b supplied to the RDL 101 is not substantially affected by the voltage drop $\Delta V1$.

Thereby, it is possible to suppress a fluctuation in the potential difference between the upper power supply terminal and the lower power supply terminal due to a fluctuation in the potential of the upper power supply terminal.

Second Preferred Embodiment

Figure 4:
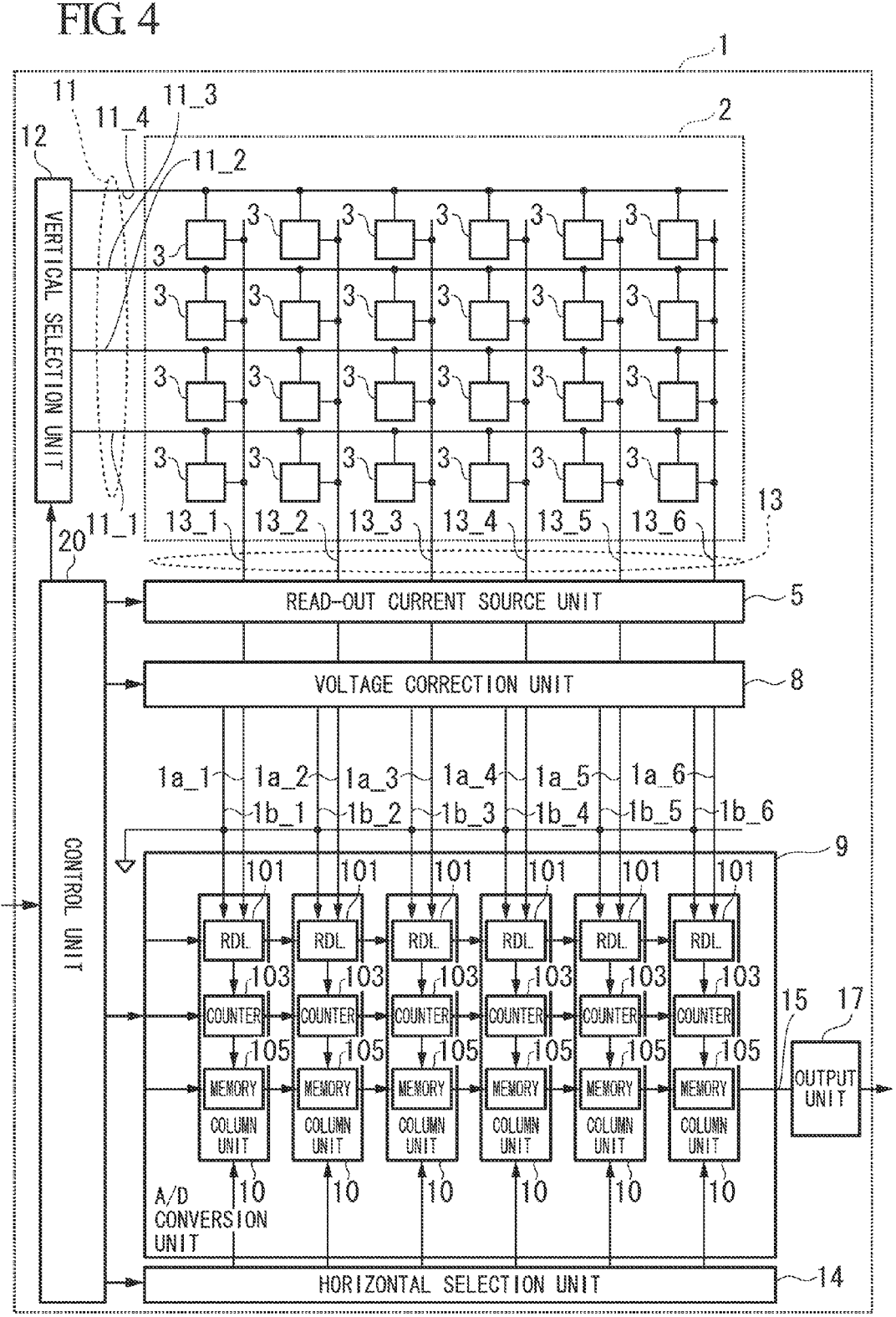
FIG. 4 is a configuration diagram showing a schematic configuration of a solid-state image pickup device in accordance with a second preferred embodiment of the present invention.

FIG. 4 is a configuration diagram showing a schematic configuration of a solid-state image pickup device in accordance with a second preferred embodiment of the present invention. A (C)MOS is used as the solid-state image pickup device. Hereinafter, the configuration of the solid-state image pickup device will be described with reference to the drawings.

A solid-state image pickup device 1 includes an image pickup unit 2, a vertical selection unit 12, a read-out current source unit 5, a voltage correction unit 8, an AD conversion unit 9, a horizontal selection unit 14, an output unit 17, and a control unit 20.

In the image pickup unit 2, a plurality of unit pixels (pixels) 3 are arranged in a matrix to output a pixel signal corresponding to the amount of an incident electromagnetic wave. The vertical selection unit 12 reads and selects each row of the unit pixels 3 arranged in the image pickup unit 2. The read-out current source unit 5 reads a signal output by the image pickup unit 2 as a voltage signal.

The voltage correction unit 8 is the same as the voltage correction unit 8 described in the first preferred embodiment, and suppresses a fluctuation in a potential difference between the upper power supply terminal and the lower power supply terminal of the RDL 101 provided in the AD conversion unit 9. The AD conversion unit 9 AD-converts a signal output by the voltage correction unit 8. The horizontal selection unit 14 selects and reads data stored by a memory 105 provided in the AD conversion unit 9. The output unit 17 outputs a read signal to the horizontal selection unit 14. The control unit 20 controls each part provided in the solid-state image pickup device 1.

Although the case where the image pickup unit 2 includes unit pixels 3 of 4 rows×6 columns in the solid-state image pickup device 1 shown in FIG. 4 has been described to simplify the drawing, several tens to several thousands of unit pixels 3 are actually arranged in each row or column of the image pickup unit 2. Although not shown, the unit pixels 3 constituting the image pickup unit 2 include a photoelectric conversion device such as a photodiode, a photo-gate, or a phototransistor, and a transistor circuit.

The unit pixels 3 are connected to the vertical selection unit 12 via vertical control lines 11_1 to 11_4 for a row selection. Each signal output from the unit pixels 3 constituting each row selected is connected to the read-out current source unit 5 and the voltage correction unit 8 via vertical signal lines 13_1 to 13_6.

Figure 5:
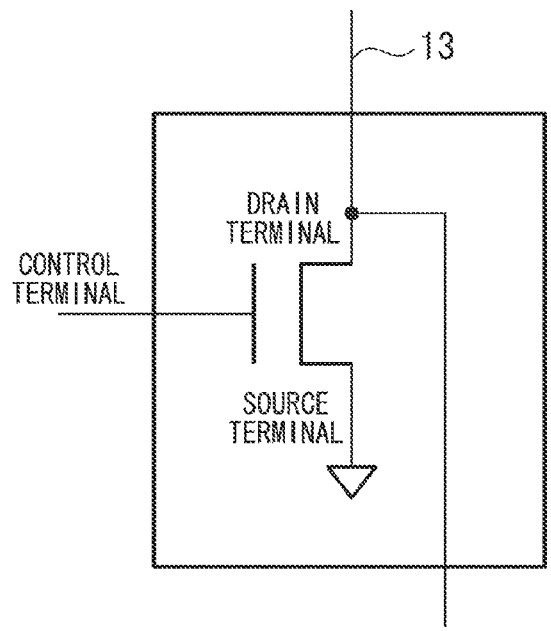
FIG. 5 is a diagram showing an example of a circuit of a read-out current source unit of a solid-state image pickup device in accordance with a second preferred embodiment of the present invention.

FIG. 5 is a diagram showing an example of a circuit of the read-out current source unit 5. An example in which the read-out current source unit 5 is configured using an NMOS transistor is shown. A vertical signal line 13 is connected from the image pickup unit 2 to a drain terminal, a desired voltage is appropriately applied to a gate terminal, and a source terminal is connected to GND. Thereby, a signal from a pixel is output in a voltage mode. Although the case where the NMOS transistor is used as the read-out current source unit 5 has been described in the example shown in FIG. 5, the present invention is not limited thereto.

Figure 6:
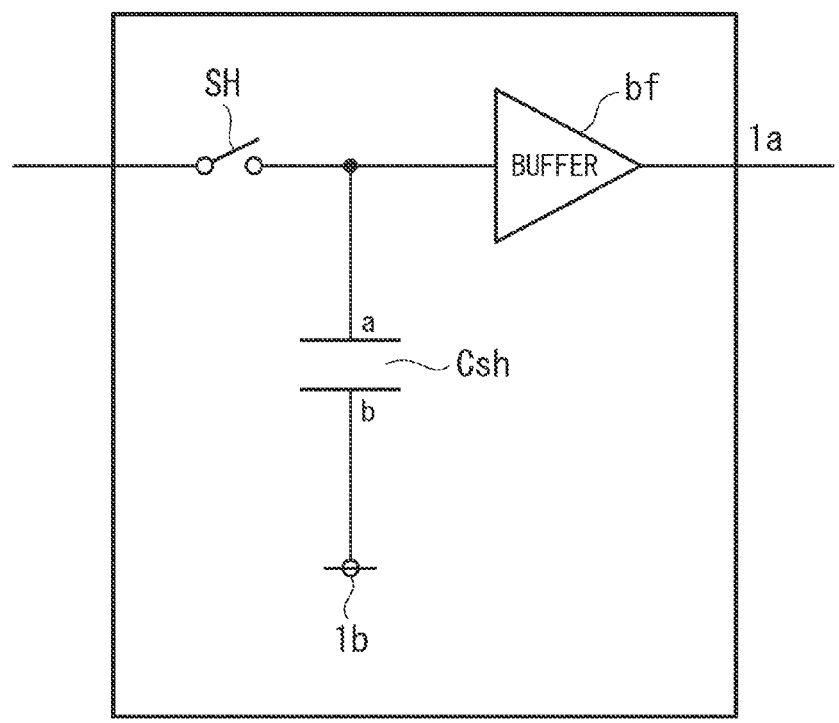
FIG. 6 is a diagram showing an example of a circuit of the voltage correction unit of a solid-state image pickup device in accordance with a second preferred embodiment of the present invention.
Figure 7:
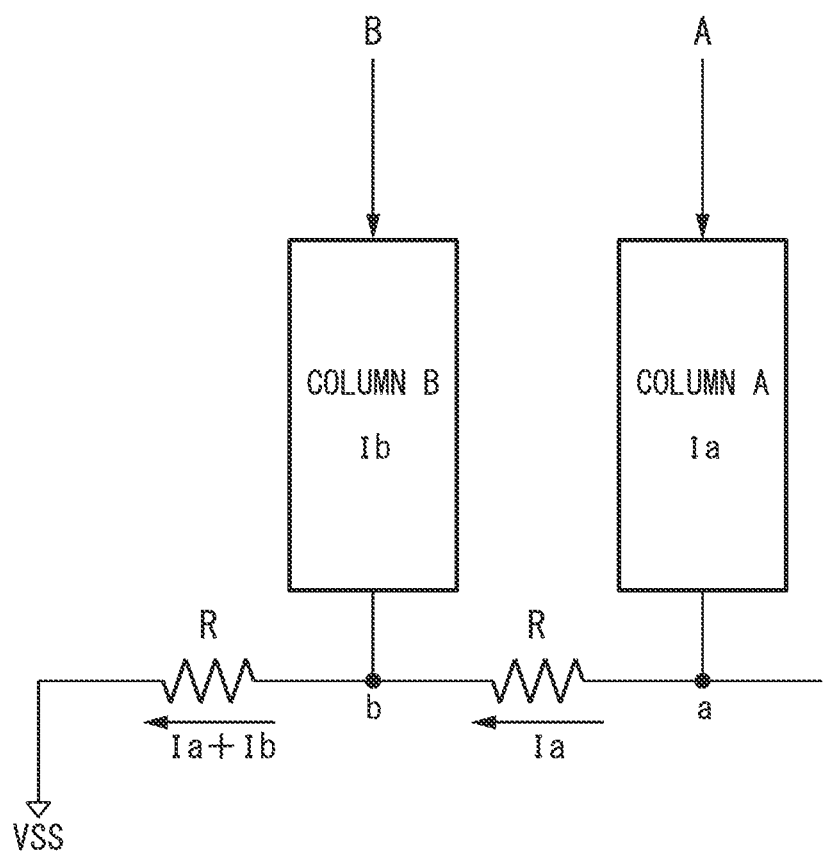
FIG. 7 is a circuit diagram for describing a voltage drop.

FIG. 6 is a diagram showing an example of a circuit of the voltage correction unit 8. The voltage correction unit 8 includes a switch element SH to sample and hold a pixel signal from the image pickup unit 2, a capacitance element Csh having a first terminal a connected to the switch element SH and a second terminal b connected to a lower power supply terminal 1b of the RDL 101, and a buffer circuit bf, which supplies a voltage corresponding to the pixel signal to an upper power supply terminal 1a of the RDL 101. The output impedance of the buffer circuit bf is low and the input impedance is high.

Next, an operation of the voltage correction unit 8 will be described. First, the switch element SH is turned on, so that the voltage corresponding to the pixel signal is sampled to the capacitance element Csh, and then the switch element SH is turned off. Thereafter, the voltage held in the capacitance element Csh is AD-converted.

For example, if a voltage rise $\Delta V1$ occurs in the lower power supply terminal 1b of the RDL 101 during the AD conversion, the voltage rise $\Delta V1$ also occurs in the second terminal b of the capacitance element Csh. The capacitance element Csh is configured to be a certain degree larger than parasitic capacitances added to the first terminal a and the second terminal b, so that a voltage of the first terminal a of the capacitance element Csh is raised by a voltage $\Delta V2$ ($\approx \Delta V1$), which is approximately equal to the voltage rise $\Delta V1$. That is, a potential difference between the upper power supply terminal 1a and the lower power supply terminal 1b supplied to the RDL 101 is not substantially affected by the voltage rise $\Delta V1$.

Thereby, it is possible to suppress a fluctuation in the potential difference between the upper power supply terminal and the lower power supply terminal due to a fluctuation in the potential of the lower power supply terminal. An analog processing unit having a CDS function, an amplification function, or the like may be provided in a previous stage of the voltage correction unit 8.

Now, description will return to FIG. 4. The AD conversion unit 9 includes column units 10. The column unit 10 includes the RDL 101, which is a frequency conversion unit for performing a frequency modulation according to a voltage difference between the upper power supply terminal 1a and the lower power supply terminal 1b, a counter 103, which is a counting unit for counting clocks output from the RDL 101, and a memory 105, which is a memory unit for retaining a value of the counter 103.

A detection means for detecting an output signal from each of a plurality of inverting circuits constituting the RDL 101 and a memory means for retaining its value may be embedded in the column unit 10. Although it is preferable to use an asynchronous counter circuit capable of being easily controlled as the counter 103, a synchronous counter circuit may be used.

Because a pixel signal output from the image pickup unit 2 is expressed by a reference level such as a reset level and a true signal level overlapping the reset level, it is necessary to process a difference between the reset level and the signal level so as to extract the true signal level. The difference is easily processed using an up/down counter having an up-count mode and a down-count mode as a counter circuit constituting the counter 103.

For example, it is preferable that a counting process be performed in the up-count mode when the reset level is read and in the down-count mode when the signal level is read. Of course, the counting process may be performed in the down-count mode when the reset level is read and in the up-count mode when the signal level is read. Because the difference processing does not necessarily need to be performed by the counter 103, it is not necessary to limit the counter circuit constituting the counter 103 to the up/down counter.

The vertical selection unit 12 or the horizontal selection unit 14 performs a selection operation in response to a drive level given from the control unit 20. Various pulse signals for driving the unit pixels 3 are included in the vertical control lines 11_1 to 11_4.

Although not shown, the vertical selection unit 12 may include a vertical shift register or decoder to basically control a row from which a signal is read, or may include a shift register or decoder to perform a row control operation for an electronic shutter. Likewise, although not shown, the horizontal selection unit 14 includes a horizontal shift register or decoder, and has a function as a selection means for selecting data memorized within the column circuit 10 constituting the AD conversion unit 9 in a predetermined order and outputting selected pixel information to a horizontal signal line 15.

Although not shown, the control unit 20 includes a functional block of a timing generator (TG), which supplies a clock or a pulse signal of a predetermined timing necessary for an operation of each part, and a functional block for communicating with the above-described TG. The control unit 20 may be provided as a separate semiconductor integrated circuit, independent of other functional elements such as the image pickup unit 2 or the vertical selection unit 12 and the horizontal selection unit 14. In this case, an image pickup device, which is an example of a semiconductor system, is constructed of an imaging device, including the image pickup unit 2 or the vertical selection unit 12 and the horizontal selection unit 14, and the control unit 20. The image pickup device may be provided as an imaging module in which a peripheral signal processing or power supply circuit and the like are embedded.

The output unit 17 amplifies a pixel signal of each unit pixel 3 output via the horizontal signal line 15 from the image pickup unit 2 at a proper gain, and outputs the amplified signal to an external circuit as an imaging signal. For example, the output unit 17 may perform only a buffering operation. Prior to this, a signal processing function such as black level adjustment, column variation correction, or color processing may be embedded. Furthermore, serial data may be output by converting n-bit parallel digital data into the serial data. In this case, for example, a multiplication circuit such as a phase locked loop (PLL) circuit may be embedded in the solid-state image pickup device 1.

As described above, it is possible to implement a solid-state image pickup device capable of reducing the potential fluctuation without being affected thereby using this configuration even when the potential of a power supply/ground fluctuates.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A solid-state image pickup device comprising:
an image pickup unit in which a plurality of pixels are arranged in a matrix, each of the plurality of pixels outputting a pixel signal corresponding to the amount of an incident electromagnetic wave;
a sample-and-hold unit having a switch element and a capacitance element, the switch element and the capacitance element sampling and holding the pixel signal;
a frequency conversion unit in which a plurality of stages of inverting circuits are connected, the inverting circuits varying delay times of an input signal and an output signal based on a potential difference between signals supplied to a first power supply terminal and a second power supply terminal, the pixel signal is supplied to the first power supply terminal, and a start signal for starting clock generation and an output signal from the inverting circuit of a predetermined stage are input to one of the inverting circuits, the frequency conversion unit generating a clock at a frequency corresponding to a magnitude of the pixel signal;
a counting unit that counts the clock output from the frequency conversion unit; and
a buffer circuit provided between a first terminal of the capacitance element connected to the switch element and the first power supply terminal,
wherein a second terminal of the capacitance element is connected to the second power supply terminal.

* * * * *